UNITED STATES PATENT OFFICE.

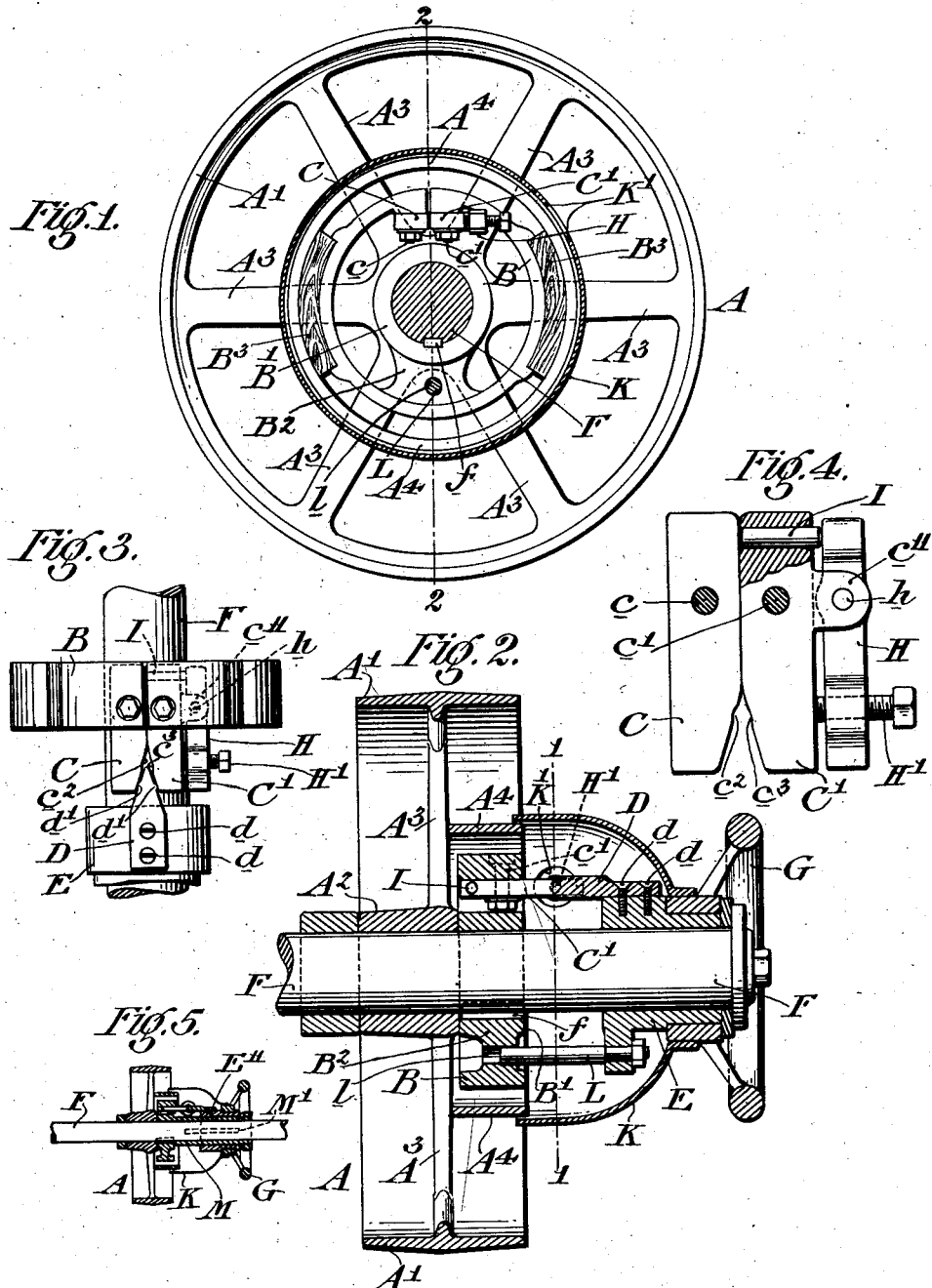

HENRY DRUSCHEL, OF MANHEIM, PENNSYLVANIA.

FRICTION-CLUTCH.

1,021,972.     Specification of Letters Patent.     Patented Apr. 2, 1912.

Application filed January 3, 1911. Serial No. 600,603.

*To all whom it may concern:*

Be it known that I, HENRY DRUSCHEL, a subject of the Emperor of Germany, having declared my intention of becoming a citizen of the United States, residing at Manheim, in the county of Lancaster and State of Pennsylvania, have invented certain new and useful Improvements in Friction-Clutches, of which the following is a specification.

My present invention relates to friction clutches for detachably uniting shaft-couplings, pulleys, gears, or other like parts of mechanical contrivances, but particularly for use in connection with couplings or connections applied to gas and naphtha engines, and to this end embodies further improvements in the friction clutch shown and described in Letters Patent granted to me March 30, 1909, Serial Number 916,682.

The object of the present invention is to simplify and improve the construction of friction clutches of this type, make them more easily adjustable for the purpose of taking up wear upon the friction members, and to make them better able to withstand the conditions of use to which they may be subjected. The latter object is obtained in a large measure, by inclosing the working parts of the clutch in such a manner as to prevent fouling of such parts with a belt or other object tending to impede motion as also the proper working of the clutch mechanism.

The various features of novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated and described one of the forms in which my invention may be embodied.

Referring now to the several figures of the drawings, Figure 1 illustrates a front elevation, partly in section, of a pulley mounted upon a shaft and provided with a friction clutch constructed according to my invention, the section being on line 1—1 of Fig. 2. Fig. 2 shows a vertical section of the device taken on line 2—2 of Fig. 1. Fig. 3, represents a detached plan view of the clutch mechanism. Fig. 4, is a similar view of portions of the clutch mechanism drawn to an enlarged scale, and Fig. 5 is a vertical section similar to Fig. 2 on a reduced scale of a slightly modified form of clutch.

In the drawings, A represents a pulley comprising a rim $A'$ and hub $A^2$, connected to the rim by spokes $A^3$ which serve to support a ring or flange $A^4$ interposed between the rim and hub.

B represents a split ring connected to a hub $B'$ by a web $B^2$ and provided with segmental blocks $B^3$, $B^3$, made preferably of wood and adapted to bear against the inner surface of the flange $A^4$.

The ring B is somewhat thickened at the free ends to form a bearing for a pair of levers C and C' which are fulcrumed to the ends of the ring by bolts $c$ and $c'$. The long arms of the levers C and C' are beveled off on the inside so that when brought together they form a V shaped slot for the reception of a wedge D.

The wedge D is secured to a sleeve E by screws $d$, $d$, which sleeve is loosely journaled on a shaft F, and is capable of being manually moved forward and backward upon the shaft F, by a hand wheel G, in like manner loosely mounted on the sleeve E.

When the hand wheel G is moved forward the wedge D will enter the space between the levers C and C' forcing the long arms of the levers apart as the wedge advances and causing the ring B to expand and the blocks carried by said ring to engage the flange $A^4$ with considerable pressure.

In order to compensate for the wear on the blocks $B^3$ the lever C' is provided with an arm H fulcrumed by a pin $h$ to a projection $C''$ of the arm C', one end of arm H, as shown in Figs. 3 and 4, being provided with an adjusting screw H' and the other bearing against a pin I, passing through a suitable hole in the short arm of the lever C' and abutting against the lever C. By this arrangement the pin I when forced against the member C' will cause a greater spreading of the ring B when the wedge D is forced into place between the levers C and C'.

As will be seen in the drawings, the pulley A is loosely supported upon the shaft F, as is also the sleeve E. The split ring B, however, is fixed to the shaft F by means of a key $f$, so that when the ring B is spread apart by the engagement of the wedge with the levers C and C', the ring engaging the flange on the pulley will cause the pulley to turn with it and with the shaft to which the ring is securely fastened.

By reference to Figs. 3 and 4 of the drawings, it will be noticed that the levers C and C' are recessed at points $c^2$ and $c^3$ where the wedge D enters the space between the levers, and that the wedge D is provided with corresponding projections $d'$, $d'$ to engage the said recesses, so that the wedge when pressed forward to the full extent of its movement will engage the recesses of the levers, and by this means be secured against accidental displacement.

In order to protect the working parts of the clutch, and to guard against injury to a belt, which may be carried by the pulley A and accidentally thrown into the working parts of the clutch, I provide a curved shield K, which, as shown in Fig. 2 of the drawings, is fastened to the hub of the hand wheel G, and projecting outward covers the working parts of the clutch as well as a portion of the flange $A^4$.

The shield K is provided with a side opening K', as shown in Fig. 1, to permit a key to be inserted for the purpose of adjusting the screw H'.

For the purpose of keeping the wedge D in alinement with the levers C and C', the sleeve E is provided with a pin L' adapted to slide in an opening $l$ in the web of the split ring B, as shown in Figs. 1 and 2. In the modification disclosed in Fig. 5 of the drawings, the pin L is dispensed with by continuing the hub of the split ring B in such a manner as to form an inner sleeve M. Upon this sleeve the outer sleeve E'' is free to slide, but is caused to rotate with the sleeve M by engaging a key M'.

Having now described my invention, what I claim as new and desire to secure by Letters Patent, is:

1. A friction-clutch, comprising a flange having a hub loosely supported upon a shaft, a split ring having a hub fixedly secured to the shaft, levers fulcrumed to the free ends of the ring, a slidable wedge adapted to engage the levers to spread the ring, means to cause the wedge to rotate with the split ring, an arm journaled in one of the levers, and having operative connection with both of the levers, and means for adjusting the arm with relation to its supporting members.

2. A friction-clutch comprising a flanged wheel having a hub loosely supported upon a shaft, a split ring having a hub fixedly secured to the shaft, levers fulcrumed to the free ends of the split ring, a wedge arranged to move into and out of engagement with the levers, an arm journaled in one of the levers and having a pin adapted to engage the other of the levers, and a set screw for adjusting the arm with respect to its supporting member.

In testimony whereof I affix my signature in presence of two witnesses.

HENRY DRUSCHEL.

Witnesses:
JACOB H. NISSLEY,
A. H. HERSHEY.

---

Copies of this patent may be obtained for five cents each, by addressing the "Commissioner of Patents, Washington, D. C."